United States Patent [19]

Bolger

[11] 3,922,449

[45] Nov. 25, 1975

[54] INTERFITTING THREADED PART AND PROCESS OF PREPARING SAME

[75] Inventor: Bernard J. Bolger, Foxrock, Ireland

[73] Assignee: Loctite (Ireland), Limited, Dublin, Ireland

[22] Filed: Nov. 26, 1973

[21] Appl. No.: 419,015

[52] U.S. Cl. ............... 428/542; 151/14.5; 156/332; 260/89.5 R; 427/409; 428/463
[51] Int. Cl.² ...................... F16B 39/00; C09J 3/14
[58] Field of Search ........ 117/75, 72, 132 C, 132 B, 117/122 R; 156/332; 161/219, 218; 151/14.5; 85/1 C

[56] References Cited
UNITED STATES PATENTS

| | | | |
|---|---|---|---|
| 3,472,301 | 10/1969 | Pearce | 151/14.5 |
| 3,489,599 | 1/1970 | Krieble | 117/132 C |
| 3,814,156 | 6/1974 | Bachman et al. | 117/132 C X |
| 3,837,963 | 9/1974 | Frauenglass et al. | 156/332 X |

*Primary Examiner*—Ralph Husack
*Attorney, Agent, or Firm*—Jean B. Mauro; J. Rodney Reck

[57] ABSTRACT

Metallic parts, such as threaded fasteners, are coated with a curable anaerobic adhesive or sealant composition, and a coating of a cyanoacrylate adhesive is polymerized in situ thereover. The metal parts thereby are given a curable coating of an adhesive or sealant composition, said composition being protected from abrasion and contaminants by the cyanoacrylate coating.

9 Claims, No Drawings

INTERFITTING THREADED PART AND PROCESS OF PREPARING SAME

BACKGROUND OF THE INVENTION

U.S. Pat. No. 3,489,599 discloses interfitting parts, at least one of which is coated on its engagement area with an anaerobically polymerizable liquid composition, which coating in turn is covered with a substantially non-tacky coating to retain and protect the anaerobic composition on the part in the uncured state prior to the time of intended use. This patent discloses the use of both microencapsulation to enclose small droplets of the anaerobic composition and subsequently attaching said microcapsules to the surface of the part, and also the application of a coating of anaerobic composition directly to the part and providing a surface coating thereover to protect the anaerobic composition as a unit.

The present invention presents an improvement upon this latter method by providing a coating composition and method which can be rapidly utilized in production line applications to provide nearly instantaneous coating of the anaerobic composition with a hard, protective polymer shell. The shell will protect the coating of anaerobic composition from contamination, abrasion and contact with other elements which adversely affect the performance of the anaerobic composition during use. In use the shell can be readily ruptured to release the anaerobic composition to perform its bonding or sealing function.

As used above and hereafter, the term "anaerobic composition" refers to a polymerizable adhesive or sealant composition, the cure mechanism of which is chemically inhibited by oxygen. As a result, the composition will remain in the uncured state as long as contact with atmospheric oxygen is maintained. When placed between closely fitting surfaces, particularly metal surfaces, the inhibiting influence of oxygen is lost, and therefore the composition begins to cure. These compositions will be discussed in greater detail hereafter. In addition, general reference is made to the following U.S. Pat. Nos.: 3,041,322; 3,043,820; 3,046,262; 3,300,547; 3,425,988; and 3,435,012.

The term "interfitting part" refers to one of two or more objects which form a mechanical assembly after engagement by a suitable mechanism, such as bonding, pressfitting, threading or otherwise, as will be further discussed and exemplified hereafter. "Engagement area" refers to any portion of the inter-fitting part which mates with or into, or otherwise is in contact with, a second interfitting part after assembly.

THE INVENTION

This invention relates to methods for preapplying anaerobic sealant and adhesive compositions to interfitting parts, and the coated parts produced thereby. More specifically, the process aspect of the present invention comprises applying anaerobic composition to the engagement area of an interfitting part, applying an additional coating thereover comprising a polymerizable cyanoacrylate ester, and allowing said cyanoacrylate ester to polymerize to form a coating over the anaerobic composition.

In a particularly valuable embodiment, this invention also relates to threaded parts having a protected coating of anaerobic composition applied to at least a portion of the threaded engagement area thereof, and to a method of preparing such threaded parts which comprises applying a coating of an anaerobic composition to at least a portion of the threaded area of a threaded part, applying over said anaerobic composition a layer of polymerizable cyanoacrylate ester, and allowing said ester to polymerize and form a solid coating over the anaerobic composition.

DISCUSSION OF THE INVENTION AND ITS PREFERRED EMBODIMENTS

The interfitting parts to which the coatings described herein are applied may vary within wide ranges, and may be prepared from essentially any air impermeable substance such as metal, glass and many plastics. Any such part which can be brought into a close, interfitting relationship with a mating part will lend itself to the process described herein. It is the objective of the invention to provide a surface coated with an anaerobic adhesive or sealant with is activated by the act of assembling or mating one such part with a second interfitting part. When the coatings are applied as described herein, the very act of assembling the two parts ruptures the polymeric cyanoacrylate protective coating, and releases the anaerobic adhesive or sealant in an atmosphere where oxygen is excluded, thereby permitting it to harden and perform its intended adhesive or sealant function. Typical interfitting parts, as defined herein, are rivets, flanges, or bondable substrates. Of specific interest are threaded parts, such as threaded fasteners, pipe and pipe fittings. In such parts the anaerobic composition can be applied to a portion or all of the threaded engagement area by the process described herein to provide a threaded object having a protected bonding or sealing coating on said engagement area. When the coated threaded part is mated with an interfitting threaded part, the cyanoacrylate coating is broken and the anaerobic composition released and distributed throughout the threaded area. Upon hardening, a durable seal or bond is formed between the two threaded parts.

The process for coating parts as described herein has many advantages. Of primary importance is the extreme rapidity with which the protective coating of cyanoacrylate composition is formed over the anaerobic composition. Extremely high production rates are customary and essential in the manufacture of threaded fasteners or other threaded parts, and hence, application of any coating which requires substantial drying or hardening time is quite detrimental to the manufacturing operations, and in most cases has provided unfeasible for reasons of practicality and economics. In the process of this invention the protective coating is formed within a matter of seconds, well within the available retention times on part processing equipment in the relevant industries. Thus, commercial application is feasible.

As described above, the first coating to be applied to the part is a coating of anaerobic composition. Anaerobic compositions for use herein contain as primary ingredients a polymerizable acrylate ester monomer and a peroxy polymerization initiator. When used in this invention, preferably at least a portion of the acrylate monomer is a di- or other polyacrylate ester. These poly-functional monomers produce cross-linked polymers, which serve as more effective and more durable sealants and adhesives.

The polyacrylate esters may be represented by the formula

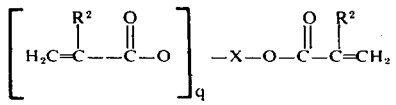

wherein $R_2$ is a radical selected from the group consisting of hydrogen, halogen and alkyl of from 1 to about 4 carbon atoms; $q$ is an integer equal to at least 1, and preferably equal to from 1 to about 4; and X is an organic radical containing at least 2 carbon atoms and preferably from 2 to about 30 carbon atoms, and having a total bonding capacity of $q$ plus 1. For example, X can be an organic radical of the formula

wherein each of $Y^1$ and $Y^2$ is a hydrocarbon group containing at least 2 carbon atoms, and preferably from 2 to about 10 carbon atoms, and Z is a hydrocarbon group containing at least 1 carbon atom, and preferably from 2 to about 10 carbon atoms.

The most highly preferred acrylate esters are polyacrylate esters which have the following general formula:

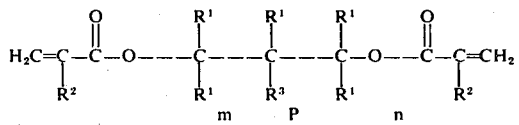

wherein $R^1$ represents a radical selected from the group consisting of hydrogen, lower alkyl of from 1 to about 4 carbon atoms, hydroxy alkyl of from 1 to about 4 carbon atoms, and

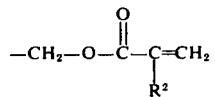

$R^2$ is a radical selected from the group consisting of hydrogen, halogen, and lower alkyl of from 1 to about 4 carbon atoms, $R^3$ is a radical selected from the group consisting of hydrogen, hydroxyl, and

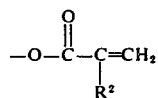

M is an integer equal to at least 1, e.g., from 1 to about 15 or higher, and preferably from 1 to about 8 inclusive; $n$ is an integer equal to at least 1, e.g., 1 to about 40 or more, and preferably between about 2 and about 10; and $p$ is one of the following: 0,1.

The polymerizable polyacrylate esters utilized in accordance with the invention and corresponding to the above general formula are exemplified by, but not restricted to, the following materials: di-, tri- and tetrethyleneglycol dimethacrylate; polyethyleneglycol dimethacrylate; polypropyleneglycol dimethacrylate; di(-pentamethyleneglycol) dimethacrylate; tetraethyleneglycol diacrylate; tetraethyleneglycol di(chloroacrylate); diglycerol diacrylate; diglycerol tetramethacrylate; tetramethylene dimethacrylate; ethylene dimethacrylate; butyleneglycol dimethacrylate; neopentylglycol diacrylate; and trimethylolpropane triacrylate.

While di- and other polyacrylate esters —and particularly the polyacrylate esters described in the preceding paragraphs—have been found particularly desirable, monofunctional acrylate esters (esters containing one acrylate group) also may be used. When dealing with monofunctional acrylate esters, it is preferable to use an ester which has a relatively polar alcoholic moiety, since the polar group tends to provide intermolecular attraction in the cured polymer, thus producing a more durable sealant or adhesive. Most preferably the polar group is selected from the group consisting of labile hydrogen, heterocyclic ring, hydroxy, amino, cyano, and halogen polar groups. Typical examples of compounds within this category are cyclohexylmethacrylate, tetrahydrofurfuryl methacrylate, hydroxyethyl acrylate, hydroxypropyl methacrylate, t-butylaminoethyl methacrylate, cyanoethylacrylate, and chloroethyl methacrylate.

As indicated above, the anaerobic compositions also contain a peroxy initiator. While certain peroxides (such as dialkyl peroxides) have been disclosed as useful initiators, the hydroperoxides are highly superior and constitute a highly preferred embodiment.

Hydrogen peroxide may be used, but the most desirable polymerization initiators are the organic hydroperoxides. Included within this definition are materials such as organic peroxides or organic peresters which decompose or hydrolyze to form organic hydroperoxides in situ. Examples of such peroxides and peresters are cyclohexyl hydroxycyclohexyl peroxide and t-butyl perbenzoate, respectively.

While the nature of the organic hydroperoxides is not critical to the broad concept of this invention, the general class of hydroperoxides can be represented by the formula $R^4OOH$, wherein $R^4$ generally is a hydrocarbon group containing up to about 18 carbon atoms, and preferably is an alkyl, aryl or aralkyl hydro-carbon group containing from about 3 to about 12 carbon atoms. Naturally, $R^4$ can contain any substituent or linkage, hydrocarbon or otherwise, which does not affect the hydroperoxide adversely for the purpose disclosed herein. Typical examples of such organic hydroperoxides are cumene hydroperoxide, tertiary butyl hydroperoxide, methylethylketone hydroperoxide, and hydroperoxides formed by oxygenation of various hydrocarbons, ketones and ethers. The organic hycroperoxide initiators which are used commonly comprise less than about 10 percent by weight of the combination of polymerizable monomer and initiator, since above that level adverse effects on the strength and durability of the cured composition may be experienced. Preferably the hydroperoxide initiator comprises from about 0.1 percent to about 5 percent by weight of the combination.

Polymerization accelerators generally are incorporated in the composition to obtain rapid cure at the time of intended use. Many free radical polymerization accelerators are known, and any may be used which do not adversely affect the anaerobic composition, such as by causing premature cure.

Among the earliest of the polymerization accelerators used in anaerobic composition were amines. The most commonly used are tertiary amines such as tributylamine and triethylamine. Essentially the entire class of tertiary amines can be used in such compositions, and the class may be broadly represented by the formula $$NR^5R^6R^7$$

wherein each of $R^5$, $R^6$ and $R^7$ is a hydrocarbon group containing up to about ten carbon atoms. Naturally, the hydrocarbon groups can contain any substituent or linkage which does not adversely affect the workability of the amine to perform its intended function. Preferably, each of $R^5$, $R^6$ and $R^7$ is an alkyl, aryl or aralkyl group containing up to about 8 carbon atoms. The N,N-dialkyl aryl amines are particularly effective tertiary amines.

Certain secondary amines (amines where $R^5$ in the above formula is hydrogen) also can be used as accelerators. The most desirable class of secondary amines has been found to be the class of heterocyclic secondary amines, particularly heterocyclic secondary amines containing up to about 20 carbon atoms. It also is preferred to use those amines wherein the heterocyclic ring is hydrogenated. Typical of such compounds are pyrrolidine, piperazine and 1,2,3,4-tetrahydroquinoline. Certain primary amines (amines where $R^5$ and $R^6$ in the above formula are hydrogen) also can be used. Typical examples are octyl amine and hexyl amine.

Another highly successful class of accelerators is the organic sulfimides, i.e., organic compounds which contain the group

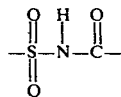

Because of the extreme effectiveness of the sulfimides as accelerators for anaerobic compositions, they are preferred accelerators. While the broad class of organic sulfimides can be used successfully, the sulfimides most commonly used can be represented by the formula

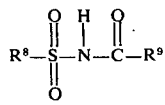

wherein each of $R^8$ and $R^9$ is a hydrocarbon group containing up to about 10 carbon atoms, and preferably up to about 6 carbon atoms. Naturally, $R^8$ and $R^9$ can contain any linkage or substituent which does not adversely affect the sulfimide for its intended use in the anaerobic composition. Further, $R^8$ and $R^9$ can be united to bond the sulfimide group in a heterocyclic ring, or a polynuclear heterocyclic ring system. Of the organic sulfimides, benzoic sulfimide has been found to be the most preferable.

An even more highly preferred composition is that which contains a sulfimide, particularly benzoic sulfimide, in combination with either a heterocyclic secondary amine or a tertiary N,N-dialkyl aryl amine, both of which are described above. For an expanded discussion of this type of system, reference is made to U.S. Pat. No. 3,218,305 to Krieble, issued Nov. 16, 1965.

Other less active accelerators can be used in the compositions of this invention. Typical examples of such accelerators are succinimide, phthalamide and formamide.

Routine testing easily will determine the optimum amount of accelerator which can be incorporated in a given anaerobic composition. As a general rule, 0.1 to 8 percent of the accelerators, based upon the weight of the total composition, generally can be used. Preferably from about 0.5 to about 5.0 percent is used.

Other ingredients also can be used if desired to impart commercially desirable properties to the composition. Typical examples of such ingredients are thickeners, plasticizers, dyes, adhesive agents and thixotropic agents. Of particular value are free radical inhibitors to provide added stability. Such materials can be used in such combinations and proportions as is desired, provided they do not affect adversely the anaerobic nature of the composition. While exceptions may exist in some cases, these materials generally do not comprise more than about 50 percent by weight of the total composition, and preferably not more than about 20 percent by weight of the composition.

The protective coating used in this invention is based upon one or a mixture of polymerizable cyanoacrylate esters. Most commonly, the esters have the formula

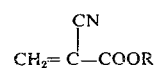

wherein R represents a $C_{1-16}$ alkyl, cycloalkyl, alkenyl, cycloalkenyl, phenyl or heterocyclic (such as furfuryl) radical. Naturally, the above R group can contain any linkages or substituents which do not adversely affect the monomer in the performance of its intended function in the cyanoacrylate adhesive compositions, such as strongly basic substituents which may adversely affect the stability of the adhesive composition. For purposes of this invention, the preferred monomers are those wherein R is a cyclohexyl or a $C_1$ to $C_6$ alkyl, or alkenyl radical. The esters may be used singly or in admixture.

The above monomeric esters of 2-cyanoacrylic acid can be prepared by methods known in the art, such as those described in U.S. Pat. Nos. 2,467,927 to Ardis, issued Apr. 9, 1949, and 3,254,111 to Hawkins et al., issued May 31, 1966.

Cyanoacrylate ester adhesive compositions generally contain an anionic polymerization inhibitor, e.g., an acidic substance, soluble in the ester of 2-cyanoacrylic acid, which inhibits anionic polymerization. The specific inhibitor chosen is not critical to this invention, and a number of suitable inhibitors of anionic polymerization are well known in the art.

The best known are the soluble acidic gases such as sulfur dioxide, sulfur trioxide, nitric oxide, and hydrogen fluoride. More recently, organic sultone inhibitors have been developed, the sultone being generally represented by the formula

wherein X is an organic radical joining the —$S(O_2)O$— group in a 4, 5, or 6 member heterocyclic ring, preferably a 5 member heterocyclic ring. Preferably, X is a hydrocarbon group, although it can contain any substituents or linkages which do not adversely affect the sultone for its intended use as a stabilizer of the adhesive composition. Another excellent class of stabilizers are the organic sulfonic acids, preferably having a molecular weight less than about 400. To be optimally useful as a stabilizer in the adhesive compositions, the sulfonic acid should have a pKA value (dissociation constant in water) of less than about 2.8, and preferably less than about 1.5.

While not essential, the cyanoacrylate adhesive compositions of this invention generally also contain an inhibitor of free radical polymerization. The most desirable of these inhibitors are of the phenolic type, such as quinone, hydroquinone, t-butyl catechol, p-methoxy phenol, etc.

The above inhibitors may be used within wide ranges, but the following general guidelines are representative of common practice, all figures being weight percent of the adhesive composition: acidic gases —from about 0.001% to about 0.6% by weight; sultones—from about 0.1% to about 10% by weight; sulfonic acids—from about 0.0005% to about 0.1% by weight, free radical inhibitors —from about 0.001% to about 1%.

Other common additives for cyanoacrylate adhesive compositions are plasticizers and thickeners, which generally can be used singly or in combination at a level between about 0.5% and about 10% by weight of the composition. The most common of these plasticizers are $C_1$ to $C_{10}$ alkyl esters of dibasic acids such as sebasic acid and malonic acid. Other plasticizers, such as diaryl ethers and polyurethanes, also may be used. A number of thickeners are known for use in cyanoacrylate adhesives, the most common of which are acrylate resins such as polymethylmethacrylate and polyethylmethacrylate. Other suitable thickeners include polymeric alkyl cyanoacrylates, cellulose esters such as cellulose acetate and cellulose butyrate, and polyvinyl ethers such as polyvinylmethyl ether.

Compositions of this invention are prepared from the original starting materials by a conventional mixing operation, although moderate heating may be helpful to achieve solution of the ingredients within a reasonable time.

The above described compositions may be applied to the interfitting parts by conventional processes. It is preferable to use anaerobic compositions of elevated viscosities, say, about 2,000 centipoise and preferably about 5,000 centipoise. The upper limit is basically a question of convenience, and viscosities even in the range of conventional pastes can be utilized. A preferred upper limit is 200,000 centipoise.

The anaerobic composition may be applied by spraying, brushing, dipping, extrusion or any other method which serves to transfer a film or coating to the intended surface. Preferably, the coating thereafter is smoothed to provide a flat and uniform surface for application of the cyanoacrylate coating.

The cyanoacrylate then is applied as a thin, uniform coating over the anaerobic composition, generally by spraying, vapor phase deposition, dipping or other comparable method. It may be desirable to apply the cyanoacrylate in admixture with a volatile solvent to increase spreadability and reduce the film thickness. Suitable solvents are benzene, methylene chloride and carbon tetrachloride. The cyanoacrylate generally will harden within a matter of seconds to form the coating. The hardening process will be aided if the anaerobic composition contains a perceptible amount of Lewis base, e.g., amines, hydroxy radicals, etc.

EXAMPLES

The invention will now be illustrated by reference to the following description of specific embodiments thereof, given by way of example only.

EXAMPLE 1

An M.10 × 20 bolt was sprayed with methylcyanoacrylate monomer, and 5 minutes was allowed for the monomer to harden. An anaerobic sealant formulation was prepared, having the following composition, with all components specified in approximate weight percent: tetraethylene glycol dimethacrylate — 86.8%; tetraethylene glycol di-2-ethylhexoate — 10%; cumene hydroperoxide — 2.5%; O-benzoic sulfimide — 4%; dimethyl-p-toluidine — 0.3%; and quinone — 100 parts per million. The viscosity of this sealant formulation was increased to approximately 5,000 cps by the addition of dipropoxy "Bisphenol A" maleate and then applied to the treated area of the bolt, above. Due to the high viscosity of the composition, it remained in the threads of the bolt. A fine spray of methyl-2-cyanoacrylate monomer was then applied to the coated area of the bolt to cover the sealant. The methyl-2-cyanoacrylate polymerized instantly to a thin film covering the sealant, thereby holding it in place. After 3 months the bolt was observed and found to be essentially unchanged in appearance. The bolt then was assembled with a mating nut. The cyanoacrylate film was easily broken during assembly by hand, and the anaerobic composition was observed to still be in the uncured state. The assembly was allowed to stand for 6 hours to allow the anaerobic composition to cure. Thereafter, a torque of 60 kg.cm was required to remove the nut from the bolt.

EXAMPLE 2

An anaerobic sealing composition was prepared comprising in conventional proportions

| | |
|---|---|
| (a) tetraethylene glycol | - 72.3% |
| (b) aerosil (fumed silica) | - 0.5% |
| (c) mica | - 20.0% |
| (d) cumene hydroperoxide | - 2.5% |
| (e) o-benzoic sulfimide | - 0.4% |
| (f) dimethyl -p-toluidine | - 0.3% |
| (g) quinone | - 100 parts per million |

The composition then was thickened to a viscosity of 20,000 centipoise with dipropoxy "Bisphenol A" maleate and applied in a thin film to a flat steel surface. The film was then coated with a fine spray of methyl 2-cyanoacrylate, which hardened almost instantly to a thin solid film covering the sealant composition and holding it in place. Another steel surface was later brought into contact with the covered film of sealant. This had the effect of excluding oxygen with the result that the sealant composition hardened to form a gasket in situ between the two steel plates.

I claim:

1. Interfitting threaded part having on the engagement area thereof a first coating of an anaerobic composition comprising a polymerizable acrylate ester monomer and a peroxy polymerization initiator therefor, and over said first coating a second coating of a cyanoacrylate ester polymer.

2. The interfitting part of claim 1 wherein the cyanoacrylate ester polymer is a polymer of a cyanoacrylate ester having the formula $$CH_2 = \underset{\underset{COOR}{|}}{\overset{CN}{C}}$$

wherein R represents a $C_{1-16}$ alkyl, cycloalkyl, alkenyl, cycloalkenyl phenyl or heterocyclic radical.

3. The interfitting part of claim 2 wherein the anaerobic composition comprises a polymerizable acrylate ester of the formula $$\left[ H_2C = \underset{\underset{R^2}{|}}{C} - \underset{\underset{O}{\parallel}}{C} - O \right]_q -X-O-\underset{\underset{O}{\parallel}}{C} - \underset{\underset{R^2}{|}}{C} = CH_2$$

wherein $R^2$ is a radical selected from the group consisting of hydrogen, halogen and alkyl of from 1 to about 4 carbon atoms; q is an integer of from 1 to about 4; and X is an organic radical containing from 2 to about 30 carbon atoms, and having the total bonding capacity of q plus 1.

4. The interfitting part of claim 3 wherein the anaerobic composition has a viscosity between about 2,000 and 200,000 centipoise.

5. The process of preparing an interfitting part having a curable adhesive coating thereon which comprises: (a) applying to the engagement area of said part a curable anaerobic composition comprising a polymerizable acrylate ester monomer and a peroxy polymerization initiator; (b) applying over said coating of anaerobic composition a film of a curable cyanoacrylate ester monomer; and (c) allowing said cyanoacrylate ester to polymerize and form a film of cured cyanoacrylate polymer over said anaerobic composition.

6. The process of claim 5 wherein the polymerizable cyanoacrylate ester has the formula $$CH_2 = \underset{\underset{COOR}{|}}{\overset{CN}{C}}$$

wherein R represents a $C_{1-16}$ alkyl, cycloalkyl, alkenyl, cycloalkenyl, phenyl or heterocyclic radical.

7. The process of claim 6 wherein the anaerobic composition comprises a polymerizable acrylate ester of the formula $$\left[ H_2C = \underset{\underset{R^2}{|}}{C} - \underset{\underset{O}{\parallel}}{C} - O \right]_q -X-O-\underset{\underset{O}{\parallel}}{C} - \underset{\underset{R^2}{|}}{C} = CH_2$$

wherein $R^2$ is a radical selected from the group consisting of hydrogen, halogen and alkyl of from 1 to about 4 carbon atoms; *q* is an integer of from 1 to about 4; and X is an organic radical containing from 2 to about 30 carbon atoms, and having the total bonding capacity of q plus 1.

8. The process of claim 7 wherein the anaerobic composition has a viscosity between about 2,000 and about 200,000 centipoise.

9. The process of claim 8 wherein the interfitting part is a threaded fastener.

* * * * *